United States Patent [19]

Simard et al.

[11] Patent Number: 5,323,866

[45] Date of Patent: Jun. 28, 1994

[54] POWER STEERING SYSTEM

[75] Inventors: Julien Simard, Brossard; Pierre Couture, Boucherville, both of Canada

[73] Assignee: Hydro-Quebec, Montreal, Canada

[21] Appl. No.: 25,419

[22] Filed: Mar. 1, 1993

[51] Int. Cl.$^5$ .............................. B62D 5/04
[52] U.S. Cl. .................. 180/6.28; 180/79.1; 180/234; 180/142
[58] Field of Search ............ 180/79.1, 6.28, 234, 180/142; 364/424.01

[56] References Cited

U.S. PATENT DOCUMENTS

| | | |
|---|---|---|
| Re. 11,780 | 10/1899 | Krieger . |
| 2,571,180 | 10/1951 | Ball et al. ............ 180/6.28 |
| 3,154,164 | 10/1964 | Shaw et al. ............ 180/44 |
| 3,756,335 | 9/1973 | Eisele et al. ............ 180/6.28 |
| 4,196,785 | 4/1980 | Downing, Jr. ............ 180/6.28 |
| 4,541,051 | 9/1985 | Jaret et al. ............ 180/6.28 X |
| 4,549,624 | 10/1985 | Doman ............ 180/6.28 |
| 4,629,952 | 12/1986 | Shimizu ............ 180/6.28 X |
| 4,687,976 | 8/1987 | Shimizu ............ 180/6.28 X |
| 4,753,308 | 6/1988 | Noto et al. ............ 180/79.1 |
| 4,905,783 | 3/1990 | Bober ............ 180/142 |
| 4,926,960 | 5/1990 | Ishikawa et al. ............ 180/79.1 |
| 4,995,472 | 2/1991 | Hayashi et al. ............ 180/234 |
| 5,058,016 | 10/1991 | Davidovitch ............ 364/424.01 |
| 5,194,794 | 3/1993 | Shamoto ............ 318/603 |
| 5,222,568 | 6/1993 | Higasa et al. ............ 180/234 X |
| 5,238,079 | 8/1993 | Gorim ............ 180/79.1 X |

FOREIGN PATENT DOCUMENTS 0226366 11/1985 Japan ............ 180/6.28

Primary Examiner—Focarino Margaret A.
Assistant Examiner—Carla Mattix
Attorney, Agent, or Firm—Foley & Lardner

[57] ABSTRACT

A steering system used in a ground-engaged vehicle having independently motorized steerable wheels, where a steering assistance is provided by generating a differential torque in the motors for producing steering assistance forces, is disclosed. The steering assistance is provided, when a torque is applied on the steering wheel, by generating the differential torque by the motors and thus producing steering assistance forces due to virtual lever arms defined between the mean contact point of a wheel with the ground, and the virtual intersection with the ground of a prolongation of the pivot axis of the wheel.

17 Claims, 7 Drawing Sheets

POWER STEERING SYSTEM

FIELD OF THE INVENTION

The present invention relates to a steering system used in a ground-engaged vehicle having independently motorized steerable wheels.

DESCRIPTION OF THE PRIOR ART

Known in the art, there are three major types of steering systems currently used in vehicles for bringing into a turn motion the steerable wheels of the vehicle.

The first type of steering system is the muscular-energy steering system in which the steering force is produced exclusively by the driver. Such steering system is generally found only on small vehicles because the torque that the driver has to apply in the case of larger vehicles is often too great for most persons, especially when the vehicle is stopped or travelling at low speed. Usually, if the actuating force at the steering wheel exceeds 250N, this type of steering system cannot be used and power assistance becomes necessary.

The second type of steering system is the power steering system in which the steering force is produced exclusively by an energy source in the vehicle. Such steering system is not suitable for high-speed vehicles such as cars but is often found on heavy machinery.

The third type of steering system is the power-assisted steering system in which the steering force is produced by muscular energy of the driver and by an energy source. This type of steering system is currently used in high-speed vehicles such as cars.

Generally, a power-assisted steering system has a pump driven by the engine of the vehicle, an oil reservoir, corresponding hoses and pipes, a control valve and an actuator. The actuator converts the applied oil pressure into assistance force which acts on the steering assembly for intensifying the steering torque exerted by the driver.

Among the drawbacks of power-assisted steering systems, there is the fact that they require many parts which increase the weight and the costs of the vehicle. They also require a lot of power from the engine to drive the pump which is not acceptable if the energy consumption of the vehicle is a critical factor, such as in an electric vehicle where the power efficiency must be kept as high as possible to obtain a suitable range.

In U.S. Pat. No. 5,058,016, there is disclosed a computerized electrical vehicle where all driving performances are carried out merely by controlling the relative rotation speeds and tilt-angle of each driving wheel, eliminating any mechanical means regularly utilized for this purpose. The tilting occurs when differential rotation speeds are imparted to a pair of opposite driven wheels. However, it is very difficult to control such a vehicle.

Examples of other prior art steering systems can be found in U.S. Pat. Nos. 11,780, 2,571,180, 3,154,164, 3,756,335, 4,196,785, 4,753,308, 4,905,783 and 4,926,960.

SUMMARY OF THE INVENTION

The object of the present invention is to provide a steering system for a ground-engaged vehicle having at least two independently motorized steerable wheels, where a steering assistance is provided by generating a differential torque in motors for producing steering assistance forces helping the driver to turn the steerable wheels.

More particularly, the object of the present invention is to provide a steering system for a vehicle travelling on the ground, the steering system comprising:
- a steering wheel;
- a steering box;
- a steering shaft mechanically connecting the steering wheel to the steering box;
- a tie rod operated by the steering box for producing a substantially lateral movement thereof;
- two wheels operatively attached to the vehicle, each of the wheels being steerable around a pivot axis and having a mean traction point laterally offset with an intersection point of a virtual prolongation of the pivot axis with the ground, a virtual lever arm being defined between each of the mean traction point and the corresponding intersection point of the pivot axis with the ground;
- a steering linkage mechanically connecting the tie rod to the wheels, the tie rod keeping the wheels constantly and substantially parallel to each other;
- two mechanically independent motors respectively connected to the two wheels;
- first sensing means for obtaining a first signal indicative of a torque applied on the steering wheel and a direction thereof; and
- control means responsive to the first signal to produce two output signals, both indicative of a differential torque to be generated by the motors;
- whereby a steering assistance is provided, when a torque is applied on the steering wheel, by generating the differential torque by the motors and thus producing steering assistance forces due to the lever arms.

It is also an object of the present invention to provide a steering system for a low speed vehicle travelling on the ground, the steering system comprising:
- a steering wheel;
- a tie rod;
- two wheels operatively attached to the vehicle, each of the wheels being steerable around a pivot axis and having a mean traction point laterally offset with an intersection point of a virtual prolongation of the pivot axis with the ground, a virtual lever arm being defined between each of the mean traction points and the corresponding intersection point of the pivot axis with the ground;
- a steering linkage mechanically connecting the tie rod to the wheels, the tie rod keeping the wheels constantly and substantially parallel to each other;
- two mechanically independent motors respectively connected to the two wheels;
- first sensing means for obtaining a signal indicative of a position of the steering wheel;
- second sensing means for obtaining a signal indicative of a position of the tie rod; and
- control means responsive to the first and second signals to produce two output signals, both indicative of a differential torque to be generated by the motors;
- whereby a steering assistance is provided by generating the differential torque by the motors and thus producing steering assistance forces due to the lever arms.

It is a further object of the present invention to provide a method for producing a steering assistance in a vehicle travelling on the ground, the vehicle comprising:
- a steering wheel;
- a steering box;
- a steering shaft mechanically connecting the steering wheel to the steering box;
- a tie rod operated by the steering box for producing a substantially lateral movement thereof;
- two wheels operatively attached to the vehicle, each of the wheels being steerable around a pivot axis and having a mean traction point laterally offset with an intersection point of a virtual prolongation of the pivot axis with the ground, a virtual lever arm being defined between each of the mean traction points and the corresponding intersection point of the pivot axis with the ground;
- a steering linkage mechanically connecting the tie rod to the wheels, the tie rod keeping the wheels constantly and substantially parallel to each other; and
- two mechanically independent motors respectively connected to the two wheels;

the method comprising the steps of:
- obtaining a first signal indicative of a torque applied on the steering wheel and a direction thereof; and
- producing two output signals responsive to the first signal, both indicative of a differential torque to be generated by the motors;
- whereby a steering assistance is provided, when a torque is applied on the steering wheel, by generating the differential torque by the motors and thus producing steering assistance forces due to the lever arms.

It is a further object of the present invention to provide a method for producing a steering assistance in a low speed vehicle travelling on the ground, the vehicle comprising:
- a steering wheel;
- a tie rod;
- two wheels operatively attached to the vehicle, each of the wheels being steerable around a pivot axis and having a mean traction point laterally offset with an intersection point of a virtual prolongation of the pivot axis with the ground, a virtual lever arm being defined between each of the mean traction points and the corresponding intersection point of the pivot axis with the ground;
- a steering linkage mechanically connecting the tie rod to the wheels, the tie rod keeping the wheels constantly and substantially parallel to each other; and
- two mechanically independent motors respectively connected to the two wheels;

the method comprising the steps of:
- obtaining a first signal indicative of a position of the steering wheel;
- obtaining a second signal indicative of a position of the tie rod; and
- producing two output signals responsive to the first and second signals, the two output signals being indicative of a differential torque to be generated by the motors;
- whereby a steering assistance is provided by generating the differential torque by the motors and thus producing steering assistance forces due to the lever arms.

A non restrictive description of a preferred embodiment will now be given with reference to the appended drawings.

DESCRIPTION OF A PREFERRED EMBODIMENT

Figure 1:
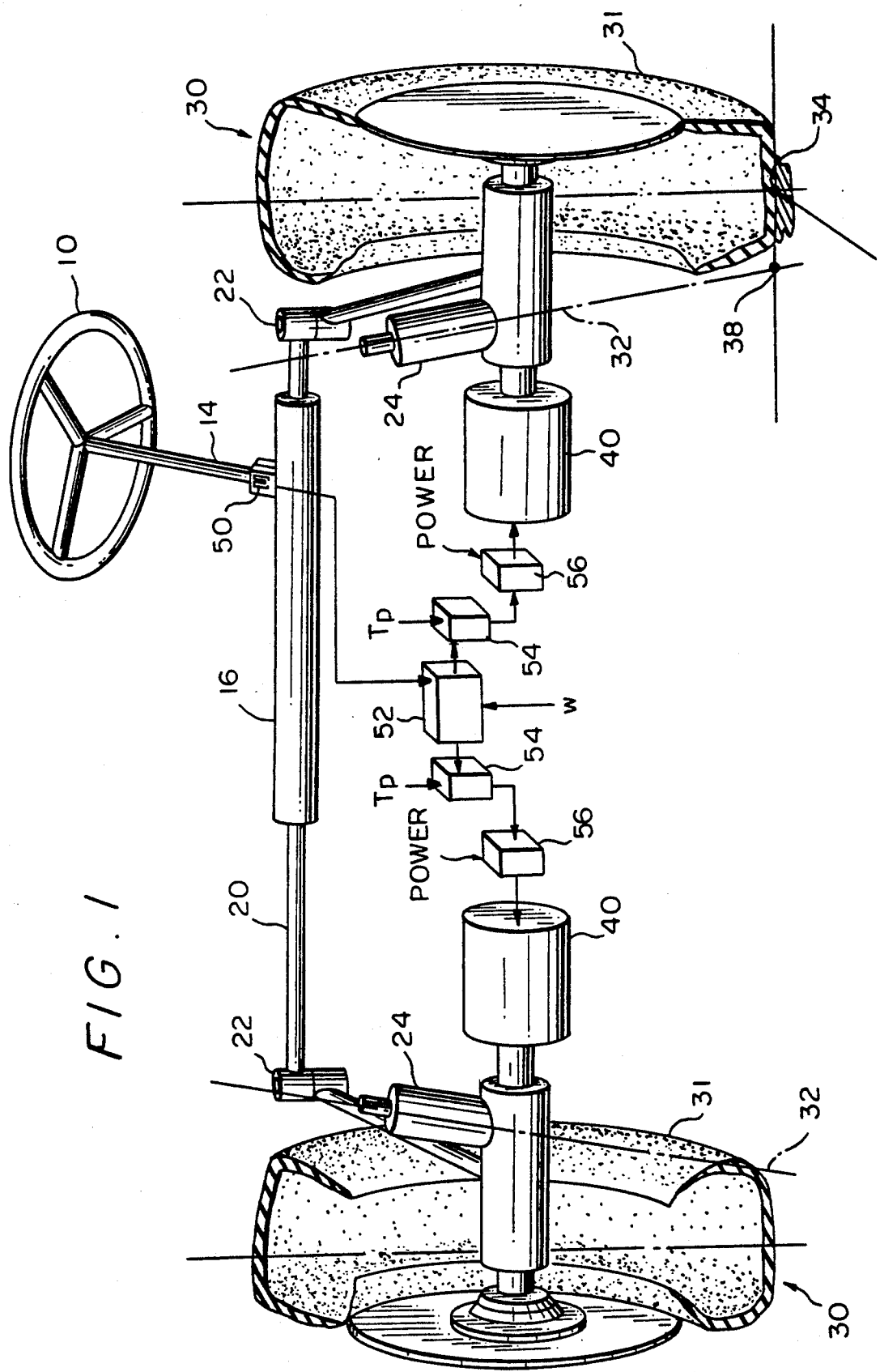
FIG. 1 is a perspective view of a schematic block diagram showing a first embodiment of the steering system according to the invention.

The steering system according to the invention, as shown in FIG. 1, comprises a steering wheel 10 mechanically connected to a steering box 16 by means of a steering shaft 14 (also called steering column in some references). The steering wheel 10, the steering shaft 14 and the steering box 16 are conventional. Although the steering box 16 shown in FIG. 1 is a rack and pinion type of steering, other types of steering, such as a worm and roller steering or a recirculating-ball steering, may also be used.

The steering box 16 operates a tie rod 20 for producing a substantially lateral movement thereof upon rotation of the steering wheel 10 by the driver.

The tie rod 20 is mechanically connected by a steering linkage to two front or rear wheels 30, each operatively attached to the vehicle and steerable around a pivot axis 32. The steering linkage comprises conventional parts such as the tie rod ends 22, the knuckle arms 24, etc. The tie rod 20 keeps the wheels 30 constantly and substantially parallel to each other.

Each wheel 30 is in contact with the ground and has a mean traction point 34 which is a virtual center point of contact. Since the wheels 30 comprise rubber tires 31 and the contact between the tires 31 and the ground is more like a surface than a single point, the concept of the mean traction point is useful because it allows to locate the point where the traction force between the ground and tire 31 is applied.

Figure 4:
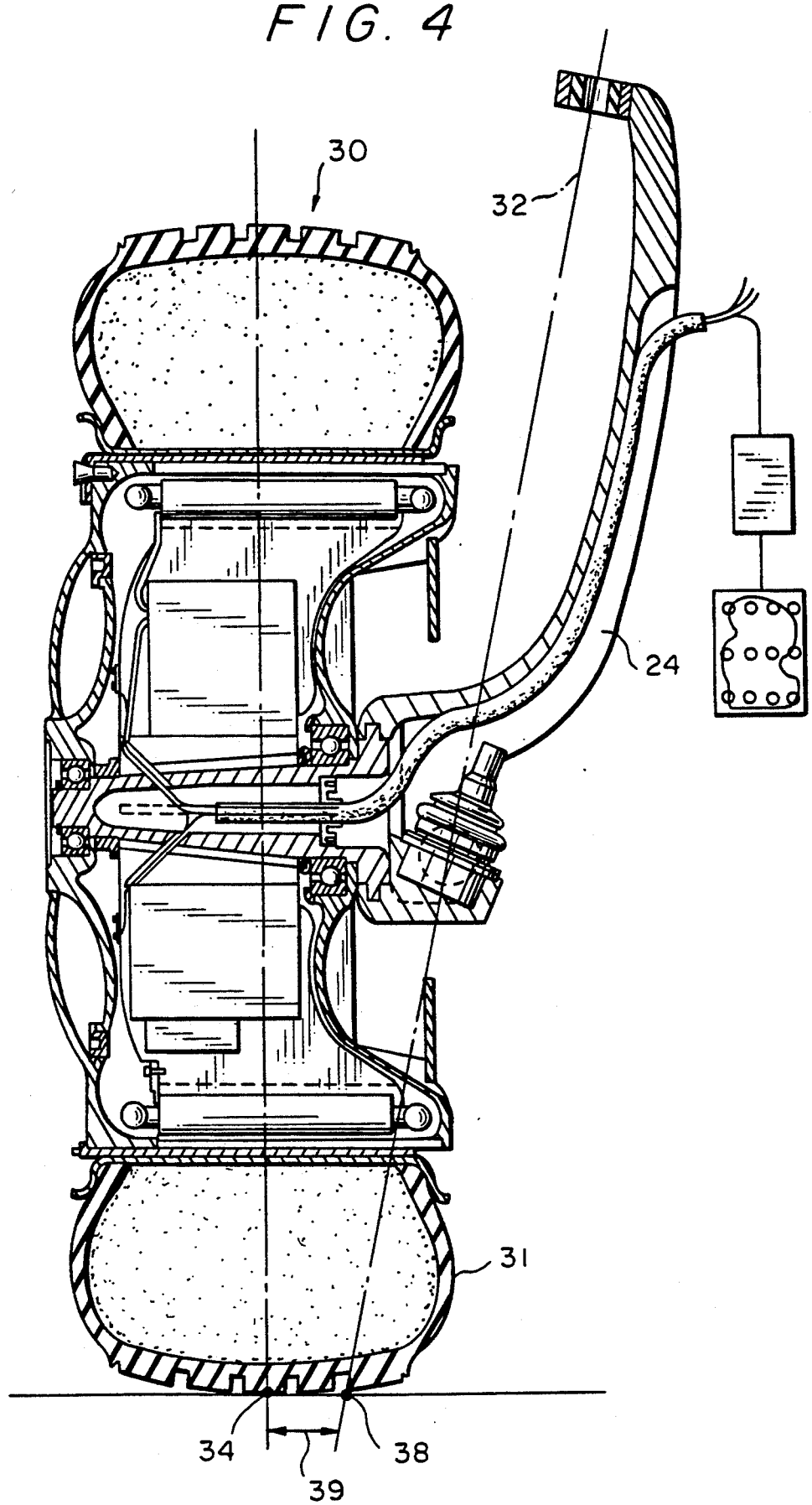
FIG. 4 is a cross-sectional view of a motor-wheel and a corresponding steering knuckle, which is shown schematically in FIGS. 2 and 3.

The mean traction point 34 must be laterally offset with an intersection point 38 of a virtual prolongation of the pivot axis 32 with the ground in order to define a virtual lever arm 39 between the mean traction point 34 and the corresponding intersection point 38 of the pivot axis 32 with the ground, as shown in FIG. 4.

Since each wheel 30 is connected to a motor 40 mechanically independent from the other, uneven torques can be applied on each wheel 30 in order to create a differential torque. The differential torque will result in uneven traction forces applied by the wheels 30 at their corresponding mean traction point 34, causing the wheels 30 to rotate around their pivot axis 32 because of the combined effect of the forces and the lever arms 39. If there were no lever arms 39, there would be no substantial rotation if a differential torque is applied.

In use, the driver who wants to initiate a turn applies a torque on the steering wheel 10. The torque is then transmitted to the steering shaft 14 and to the steering box 16 which is, as aforesaid, mechanically connected to the tie rod 20.

Figure 6:
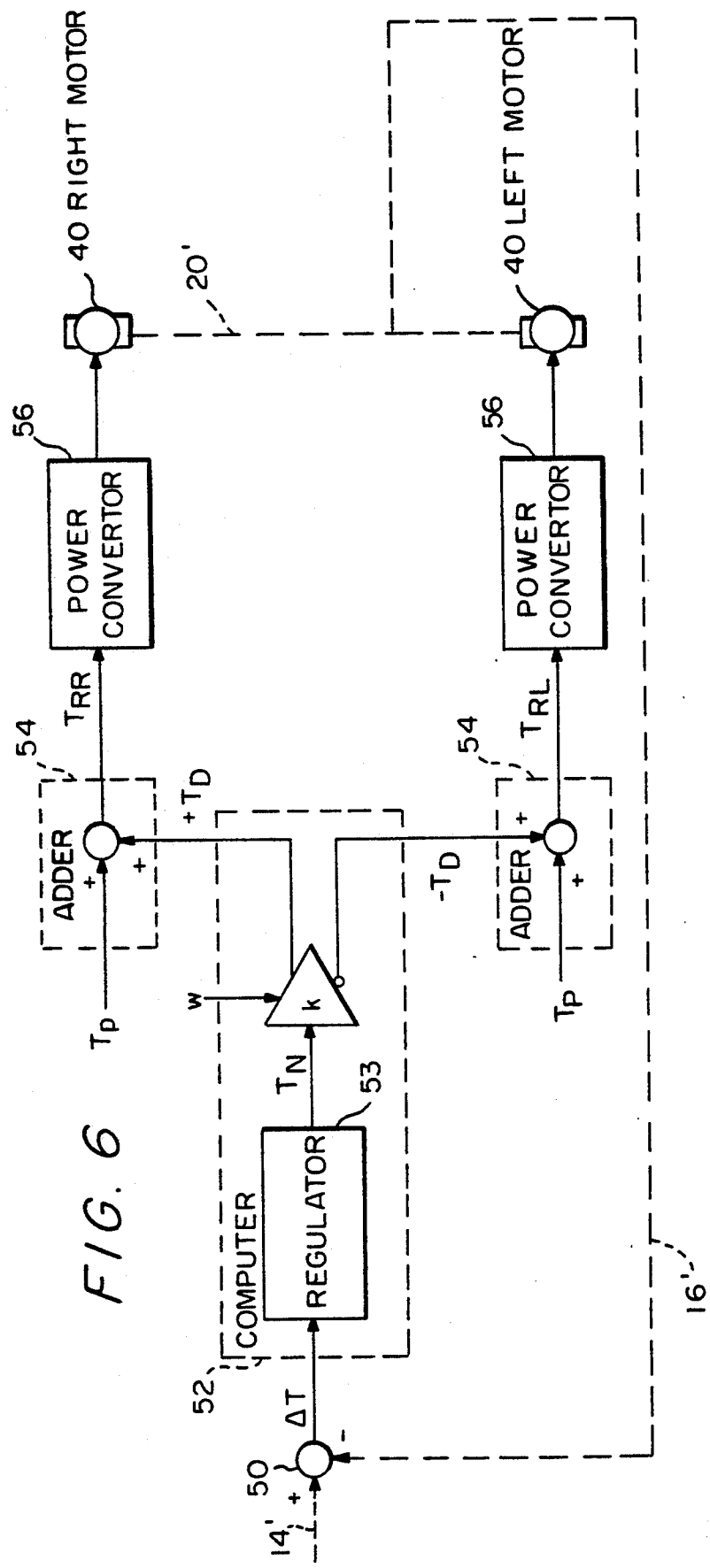
FIG. 6 is a block diagram showing how an embodiment of the present invention operates.

The torque is measured by sensing means, such as a strain gauge 50, for obtaining a signal $\Delta T$ indicative of the intensity and the direction thereof. As shown in FIG. 6, the signal $\Delta T$ is sent to control means, such as the computer 52, for producing two output signals, both indicative of a differential torque $\Delta T_{DIFF}$ to be generated by the motors 40. Preferably, the differential torque $\Delta T_{DIFF}$ is equally separated between both motors 40 and the signals can be expressed as:

$$T_D = \Delta T_{DIFF}/2$$

where $T_D$ is the signal sent to each wheel 30. One of the signal is $+T_D$ and the other is $-T_D$.

The signals $T_D$ are added to the driving torque signal $T_P$ which is selected by the driver by moving the accelerator pedal. For example, if the vehicle is stopped, the differential torque will make one motor 40 turn in one direction and the other motor 40 turn in another direction. When the vehicle is travelling forward at higher speed, the resulting torque may be applied in the same direction but with different levels.

The signals $T_D$ and $T_P$ of each wheel 30 are added in an adder 54. Since there are a right wheel 30 and a left wheel 30, the resulting signals are respectively $T_{RR}$ and $T_{RL}$. Both are sent to a corresponding convertor 56 which is linked to a power source and provides energy to the corresponding motor 40. The energy can be in the form of electricity, pressurized hydraulic fluid, pressurized air or even mechanical movement if controlled by a suitable convertor.

A steering assistance will then be produced because of the differential torque $\Delta T_{DIFF}$ and the virtual lever arms 39 which together produce steering assistance forces helping the driver in addition to the muscular-energy force thereof.

Figure 2:
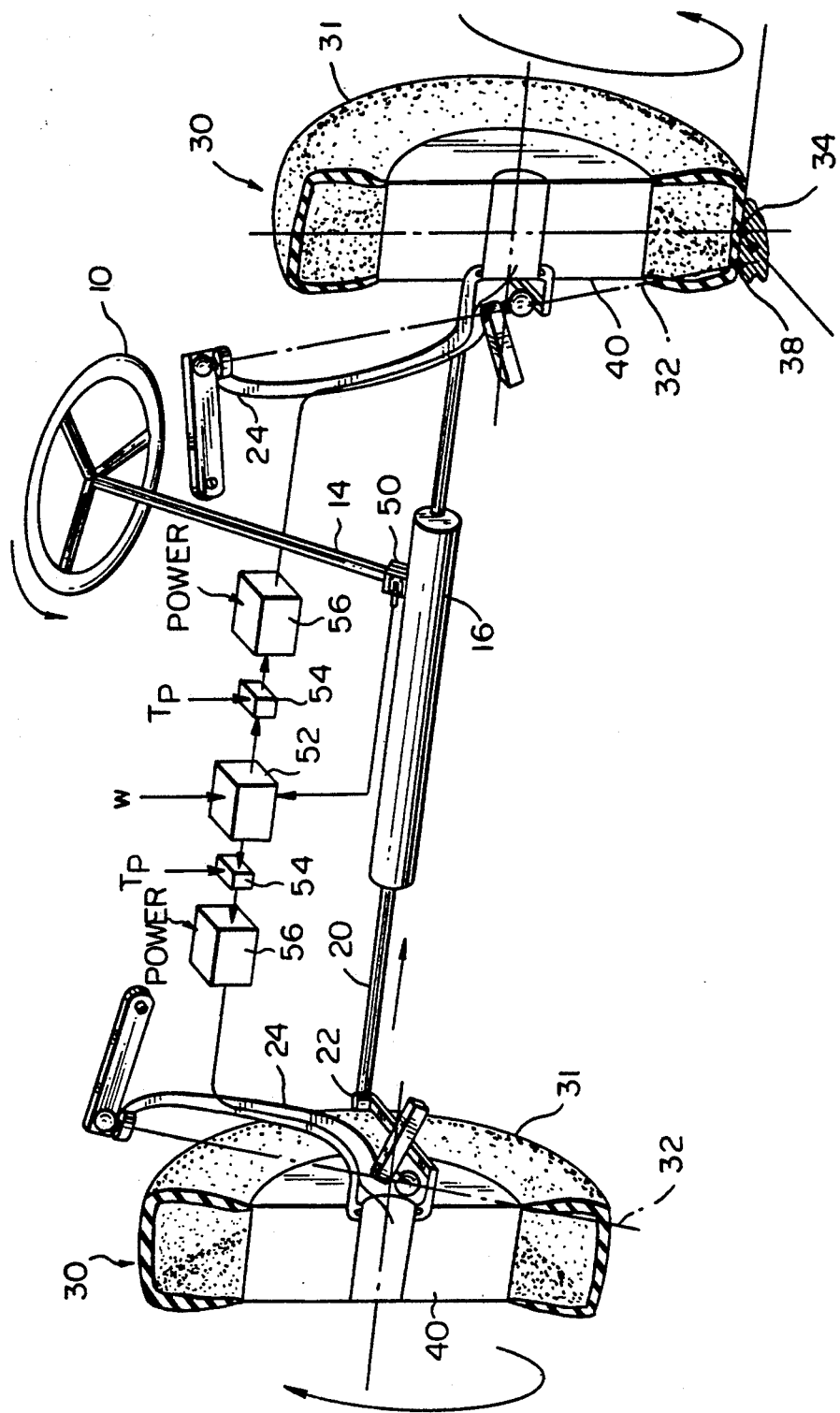
FIG. 2 is a perspective view of a schematic block diagram showing a second embodiment of the steering system according to the present invention.

In FIG. 6, the dotted lines marked as 14', 16' and 20' refer respectively to the steering column 14, the steering box 16 and the tie rod 20 shown in FIGS. 1 and 2, showing the mechanical links between them. Near the sensing means 50, the line 14' is marked as "+" while the line 16' is marked as "−" to represent the fact that the torque $\Delta T$ is only present if there is an equally opposed torque coming from the inertia, the friction and the gyroscopic forces for instance. Of course, the strain gauge 50 can be located elsewhere on the steering system than the location shown in the drawings.

Referring now to FIGS. 1, 2 and 6, when the wheels 30 are suitably turned, the driver will stop applying a torque on the steering wheel 10. Thereby, the strain gauge 50 will measure no torque, indicating to the computer 52 to stop providing differential torque signals $T_D$ for generating the steering assistance forces.

The computer 52 may comprise a regulator 53 for filtering and stabilizing the signal $\Delta T$. The regulator produces a signal $T_N$.

Additionally, instead of just amplifying and splitting the signal $T_N$ in two signals of opposite signs, the steering system may further comprise sensing means, such as a conventional speed gauge (not shown), for obtaining a signal $\omega$ indicative of the travelling speed of the vehicle. This allows the computer 52 to be further responsive to the speed of the vehicle and producing a differential torque signal $T_D$ that is a function thereof. This is achieved by applying to the signal $T_N$ a predetermined proportional coefficient programmed into the memory of the computer 52.

Figure 7:
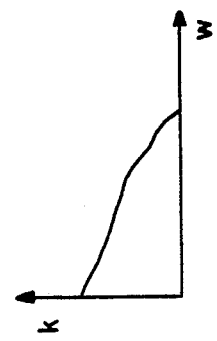
FIG. 7 is a graph of the proportional factor of an amplifier shown in FIG. 6, in function of the speed of the vehicle.

FIG. 7 shows an example of the shape of a curve of the proportional coefficient in function of the speed of the vehicle to "feel" the turns. As it can be seen, the proportional factor is maximum when the vehicle is stopped and becomes smaller as the vehicle gains speed. This is due to the fact that it takes a greater steering force to turn the wheels 30 when the vehicle is stopped. As the speed is increased, a smaller steering force is needed. Of course, one can choose to have another steering response by programming a completely different curve.

Figure 3:
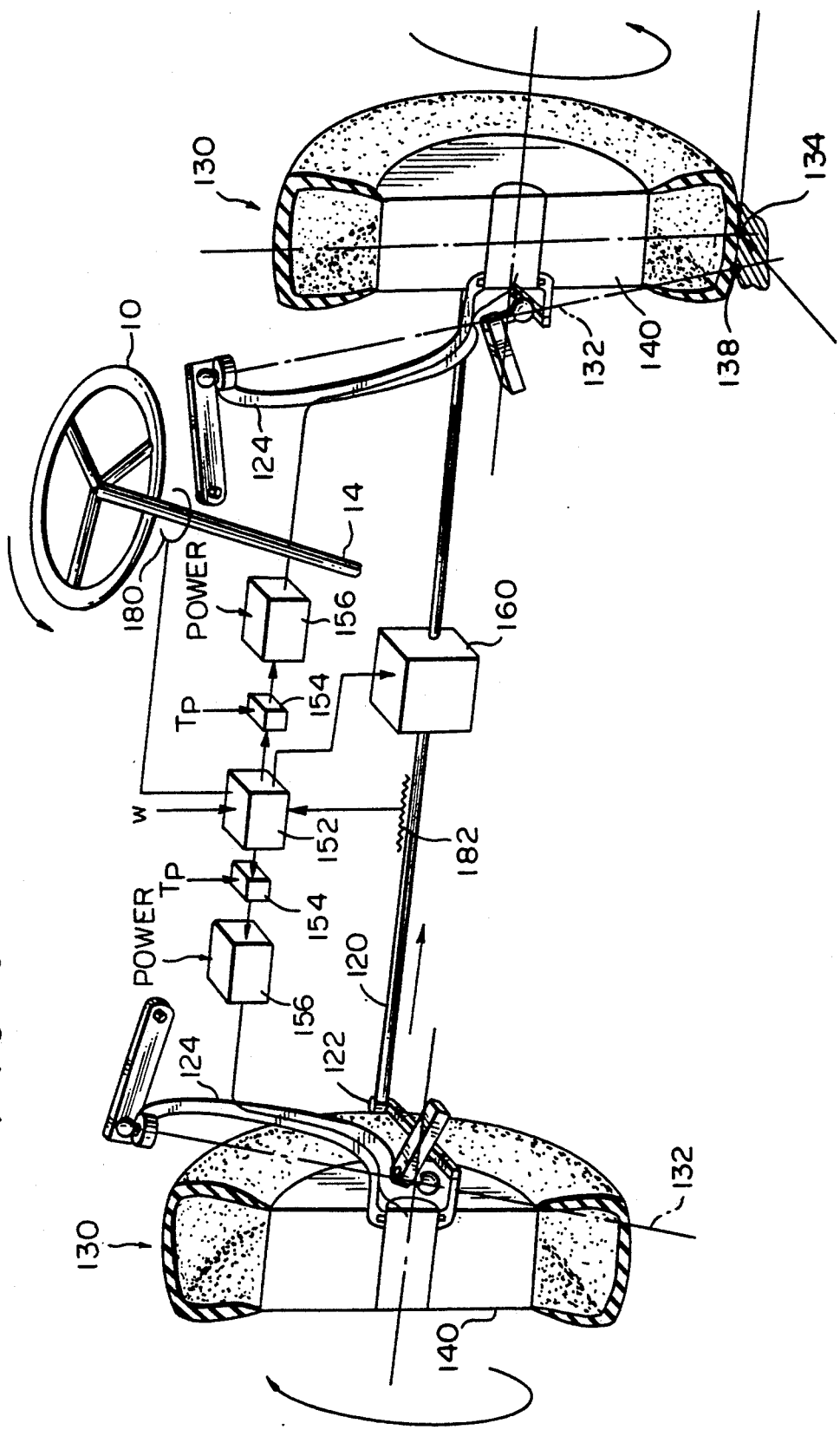
FIG. 3 is a perspective view of a schematic block diagram showing a third embodiment of the steering system according to the present invention.

As shown in FIG. 3, it is possible to steer two additional wheels opposite to the two wheels steered by the steering system. For example, it is possible to steer the rear wheels of a four-wheel vehicle, such as a car, if the wheels 30 (shown in FIGS. 1 and 2) were front wheels, and vice-versa. It is particularly useful when parking the vehicle.

Like the wheels 30 (shown in FIGS. 1 and 2), the two additional wheels, hereinafter called "wheels 130", are operatively attached to the vehicle by knuckle arms 124, are steerable around a pivot axis 132 and have a mean traction point 134 laterally offset with an intersection point 138 of a virtual prolongation of the corresponding pivot axis 132 with the ground. A virtual lever arm is then defined between each of the mean traction points 134 and the corresponding intersection point 138.

The additional steering assembly comprises a tie rod 120, a steering linkage mechanically connecting the tie rod 120 to the wheels 130, two mechanically independent motors 140 respectively connected to the two wheels 130. The steering linkage comprises tie rod ends 122, knuckle arms 124, etc.

Sensing means, such as a position gauge 180, are provided for obtaining a signal e indicative of a position of the steering wheel 10. The position gauge 180 is mounted on the steering shaft 14. Sensing means, such as a position gauge 182, are further provided for obtaining a signal $\epsilon$ indicative of a position of the tie rod 120. The $\Theta$ and $\epsilon$ signals are sent to a computer 152, which can be the computer 52 (shown in FIGS. 1 and 2) if it can handle the operations relating to the wheels 30 (shown in FIGS. 1 and 2) and 130. The computer 152 will produce two output signals, both indicative of a differential torque to be generated by the motors 140. A steering assistance will then be provided to the wheels 130 by generating the differential torque by the motors 140 and thus producing steering assistance forces due to the lever arms of the wheels 130.

Although the additional steering system has no direct mechanical link with the steering wheel 10, all the elements in the additional steering system are similar to the ones in the previously described steering system. The computer 152 is similar to the computer 52 (shown in FIGS. 1 and 2) and produces signals $+T_D$ and $-T_D$ for generating a differential torque by the motors 140, the adders 154 are similar to the adders 54 (shown in FIGS. 1 and 2) and produce signals $T_{RR}$ and $T_{RL}$ to be sent to convertors 156, themselves similar to the convertors 56

(shown in FIGS. 1 and 2). The convertors 156 provide the motors 140 with the required amount of energy coming from the power source.

Figure 5:
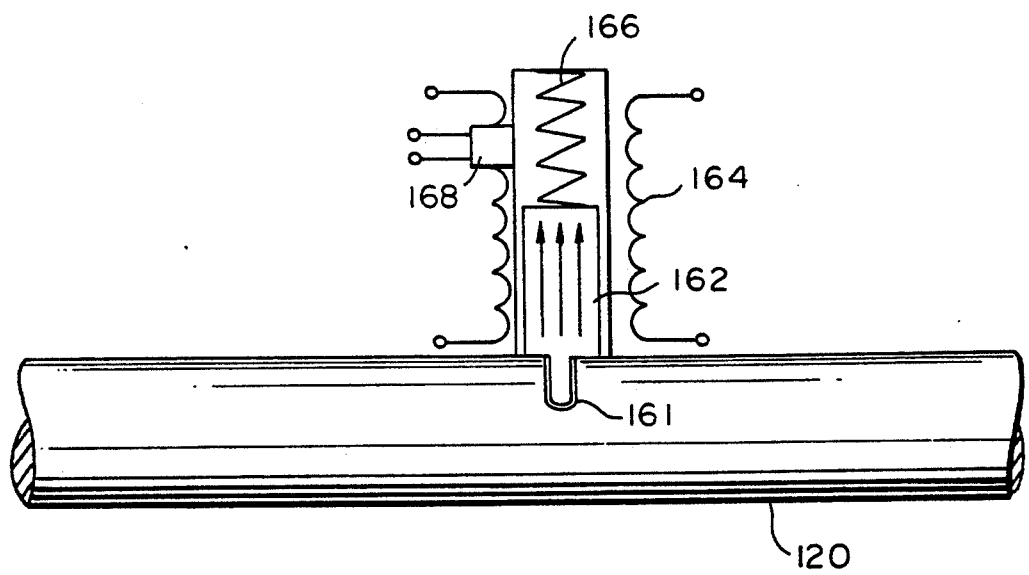
FIG. 5 is a cross-sectional view of a locking device which is shown schematically in FIG. 3.

Referring now to FIGS. 3 and 5, the additional steering system may further comprise locking means, such as the plunger 162 of the locking device 160, movable between a first position where it maintains the tie rod 120 in a substantially central position and a second position where it does not prevent the tie rod 120 from moving. The plunger 162 is controlled by the computer 152 by means of an output signal.

As shown in FIG. 5, the locking device 160 comprises a solenoid 164 for moving the plunger 162 out of a hole 161 in the tie rod 120, against the gravity and the biasing force of a spring 166. A position detector 168 is also provided to make sure that the plunger 162, once out of the hole 161, is reset back in when it is no longer needed.

For predicting precisely when the plunger 162 should be moved out of the hole 161, the computer 152 may be linked to sensing means for obtaining a signal e indicative of a speed of the vehicle, so it can be further responsive of the signal e to produce the differential signals. Knowing $\omega$ allows the additional steering system to be locked at the second position when the speed is below a predetermined value, more particularly if the speed of the vehicle is low enough to ensure that it is safe to release the plunger 162.

Referring now to FIGS. 1, 2 and 3, as aforesaid, the steering system with direct mechanical link can be used with front or rear wheels. Its use with rear wheels is particularly suitable for an industrial vehicle such as a lift truck in a warehouse. As for the additional steering system, it can optionally be used with the wheels 130 opposed to the wheels 30 steered by the steering system, front or rear. The present invention is also well adapted for the use of motor-wheels, where the motors 40 or 140 are found respectively within the wheels 30 or 130.

It is also an object of the present invention to provide a steering system using the elements described in what was called the additional steering system. This steering system then applies the same principles and can be used in low speed applications, like wheelchairs, movable robots, etc. Of course, such system has no locking device 160 in order to allow free movement of the tie rod 120.

Figure 8:
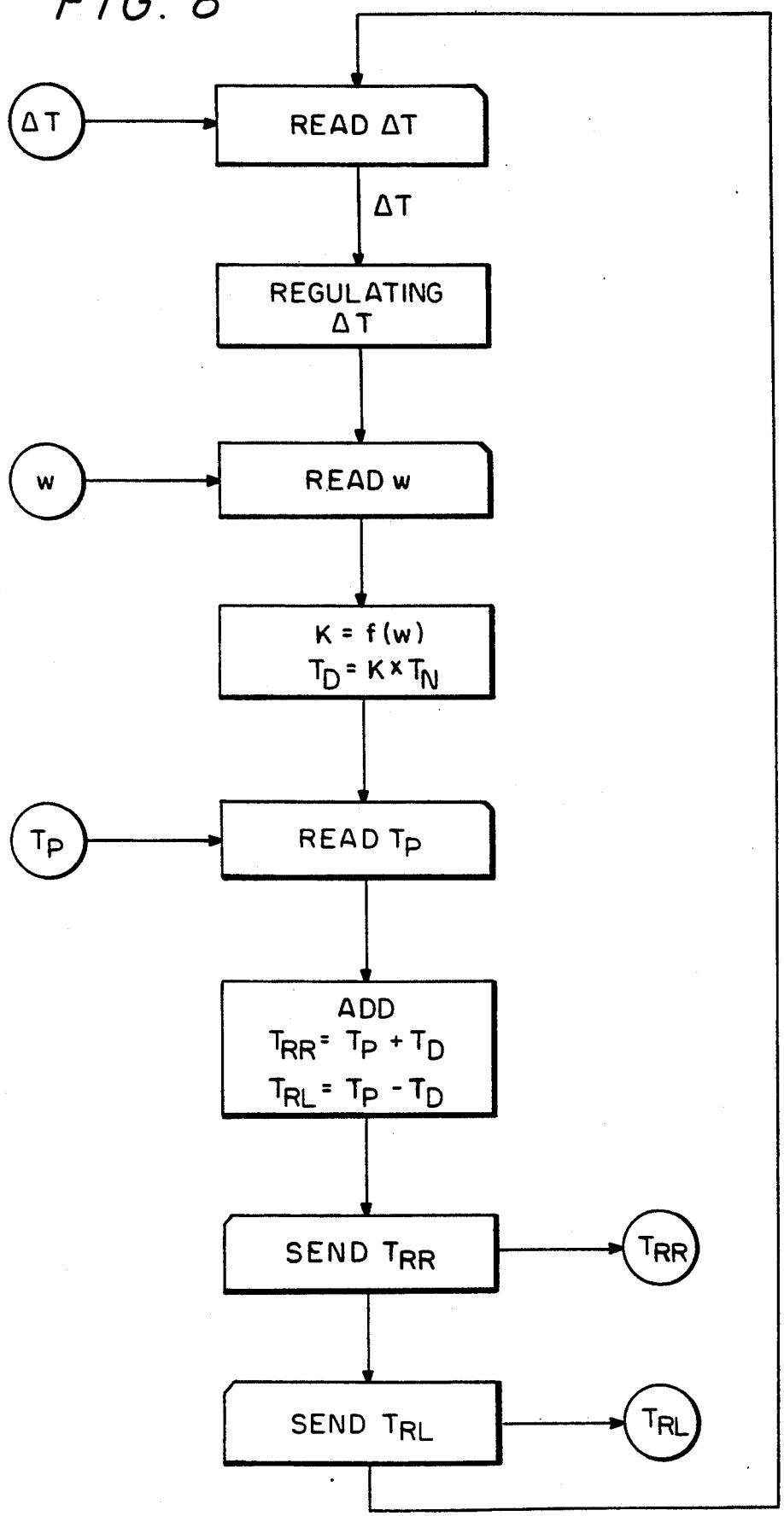
FIG. 8 is a flow chart showing the steps of a method according to the present invention.

The present invention further allows a method for producing a steering assistance in a vehicle travelling on the ground using a system substantially similar to the one already described. FIG. 8 shows an example of the steps of the present method.

Referring now to FIGS. 1, 2, 4 and 8, the method comprises the steps of:
obtaining a signal $\Delta T$ indicative of a torque applied on the steering wheel 10 and a direction thereof; and
producing two output signals responsive to the signal $\Delta T$, both indicative of a differential torque to be generated by the motors 40.

It allows a steering assistance to be provided, when a torque is applied on the steering wheel 10, by generating the differential torque by the motors 40 and thus producing steering assistance forces due to the lever arms 39.

This method may further comprise the step of obtaining a signal $\omega$ indicative of the speed of the vehicle, the two output signals being further responsive to the signal $\omega$ and the step of applying a gain to the signal $\Delta T$ prior to producing the two output signals, the gain being a function of the signal $\omega$.

Additionally, a method according to the present invention can be applied to the additional steering system as described in FIG. 3, whereby the method further comprises the steps of:
obtaining a signal e indicative of a position of the steering wheel 10;
obtaining a signal $\epsilon$ indicative of a position of the tie rod 120;
producing two output signals $+T_D$ and $-T_D$ responsive to the $\Theta$ and $\epsilon$ signals, both indicative of an additional differential torque to be generated by the motors 140.

With the additional steering system, the method may further comprise the step of producing an output signal $\mu$ for moving the locking device 160 between a first position where it maintains the tie rod 120 in a substantially central position and a second position where the locking device 160 does not prevent the tie rod 120 from moving, and may comprise the step of obtaining a signal $\omega$ indicative of the speed of the vehicle, the output signal $\mu$ being further responsive to the signal e. The locking device 160 is at the second position when the speed is below a predetermined value.

In a similar manner, a method according to the present invention can be applied to steer a low speed vehicle travelling on the ground. Such steering system is shown in FIG. 3. The method then comprises the steps of:
obtaining a signal $\Delta T$ indicative of a position of the steering wheel 10;
obtaining a signal e indicative of a position of the tie rod 120; and
producing two output signals responsive to the $\Delta T$ and $\epsilon$ signals, the two output signals being indicative of a differential torque to be generated by the motors 140.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

We claim:

1. A steering system for a vehicle travelling on the ground, said steering system comprising:
   a steering wheel;
   a steering box;
   a steering shaft mechanically connecting said steering wheel to said steering box;
   a tie rod operated by said steering box for producing a substantially lateral movement thereof;
   two wheels operatively attached to said vehicle, each of said wheels being steerable around a pivot axis and having a mean traction point laterally offset with an intersection point of a virtual prolongation of said pivot axis with the ground, a virtual lever arm being defined between each of said mean traction points and the corresponding intersection point of said pivot axis with the ground;
   a steering linkage mechanically connecting said tie rod to said wheels, said tie rod keeping said wheels constantly and substantially parallel to each other;
   two mechanically independent motors respectively connected to said two wheels;

first sensing means for obtaining a first signal indicative of a torque applied on said steering wheel and a direction thereof; and control means responsive to said first signal to produce two output signals, both indicative of a differential torque to be generated by said motors;

whereby a steering assistance is provided, when a torque is applied on said steering wheel, by generating said differential torque by said motors and thus producing steering assistance forces due to said lever arms.

2. A steering system according to claim 1, further comprising second sensing means for obtaining a second signal indicative of a speed of said vehicle, said control means being further responsive to said second signal to produce said two output signals.

3. A steering system according to claim 1, further comprising an additional steering assembly to steer two additional wheels opposite said two wheels steered by said steering system, said two additional wheels being operatively attached to said vehicle, each of said additional wheels being steerable around a pivot axis and having a mean traction point laterally offset with an intersection point of a virtual prolongation of the corresponding pivot axis with the ground, a virtual lever arm being defined between each of said mean traction points of said additional wheels and the corresponding intersection point of their pivot axis with the ground, said additional steering assembly comprising:

an additional tie rod;

an additional steering linkage mechanically connecting said additional tie rod to said additional wheels, said additional tie rod keeping said additional wheels constantly and substantially parallel to each other;

two additional mechanically independent motors respectively connected to said two additional wheels;

second sensing means for obtaining a second signal indicative of a position of said steering wheel;

third sensing means for obtaining a third signal indicative of a position of said steering wheel;

additional control means responsive to said second and third signals to produce two additional output signals, both indicative of an additional differential torque to be generated by said additional motors;

whereby a steering assistance of said additional wheels is provided by generating said differential torque by said additional motors and thus producing steering assistant forces in said additional tie rod due to said lever arms produced by the traction point of said additional wheels.

4. A steering system according to claim 3, further comprising locking means movable between a first position where said locking means maintain said additional tie rod in a substantially central position and a second position where said locking means do not prevent said additional tie rod from moving, said additional control means further producing a third additional output signal for controlling said locking means.

5. A steering system according to claim 4, further comprising fourth sensing means for obtaining a fourth signal indicative of a speed of said vehicle, said additional control means being further responsive of said fourth signal to produce said third additional output signal, said locking means being at said second position when said speed is below a predetermined value.

6. A steering system according to claim 4, wherein said locking means comprise a plunger movable in and out of a hole in said additional tie rod.

7. A steering system according to claim 1, wherein said wheels are front wheels.

8. A steering system according to claim 3, wherein said additional wheels are rear wheels.

9. A steering system according to claim 1, wherein each of said motors with its corresponding wheel is a motor-wheel.

10. A steering system for a low speed vehicle travelling on the ground, said steering system comprising:

a steering wheel;

a tie rod;

two wheels operatively attached to said vehicle, each of said wheels being steerable around a pivot axis and having a mean traction point laterally offset with an intersection point of a virtual prolongation of said pivot axis with the ground, a virtual lever arm being defined between each of said mean traction points and the corresponding intersection point of said pivot axis with the ground;

a steering linkage mechanically connecting said tie rod to said wheels, said tie rod keeping said wheels constantly and substantially parallel to each other;

two mechanically independent motors respectively connected to said two wheels;

first sensing means for obtaining a first signal indicative of a position of said steering wheel;

second sensing means for obtaining a second signal indicative of a position of said tie rod; and control means responsive to said first and second signals to produce two output signals, both indicative of a differential torque to be generated by said motors;

whereby a steering assistance is provided by generating said differential torque by said motors and thus producing steering assistance forces due to said lever arms.

11. A method for producing a steering assistance in a vehicle travelling on the ground, said vehicle comprising:

a steering wheel;

a steering box;

a steering shaft mechanically connecting said steering wheel to said steering box;

a tie rod operated by said steering box for producing a substantially lateral movement thereof;

two wheels operatively attached to said vehicle, each of said wheels being steerable around a pivot axis and having a mean traction point laterally offset with an intersection point of a virtual prolongation of said pivot axis with the ground, a virtual lever arm being defined between each of said mean traction points and the corresponding intersection point of said pivot axis with the ground;

a steering linkage mechanically connecting said tie rod to said wheels, said tie rod keeping said wheels constantly and substantially parallel to each other; and two mechanically independent motors respectively connected to said two wheels;

said method comprising the steps of:

obtaining a first signal indicative of a torque applied on said steering wheel and a direction thereof; and producing two output signals responsive to said first signal, both indicative of a differential torque to be generated by said motors;

whereby a steering assistance is provided, when a torque is applied on said steering wheel, by generating said differential torque by said motors and thus producing steering assistance forces due to said lever arms.

12. A method according to claim 11, further comprising the step of obtaining a second signal indicative of a speed of said vehicle, said two output signals being further responsive to said second signal.

13. A method according to claim 12, further comprising the step of applying a gain to said first signal prior to producing said two output signals, said gain being a function of said second signal.

14. A method according to claim 11, wherein said vehicle further comprises two additional wheels opposite to said two wheels having a steering assistance, said two additional wheels being operatively attached to said vehicle, each of said additional wheels being steerable around a pivot axis and having a mean traction point laterally offset with an intersection point of a virtual prolongation of the corresponding pivot axis with the ground, a virtual lever arm being defined between each of said means traction points of said additional wheel and the corresponding intersection point of their pivot axis with the ground, said additional steering system comprising:

an additional tie rod;

an additional steering linkage mechanically connecting said additional tie rod to said additional wheels, said additional tie rod keeping said additional wheels constantly and substantially parallel to each other; and two additional mechanically independent motors respectively connected to said two additional wheels;

said method further comprising the steps of:

obtaining a second signal indicative of a position of said steering wheel;

obtaining a third signal indicative of a position of said additional tie rod;

producing two additional output signals responsive to said second and third signals, both indicative of an additional differential torque to be generated by said additional motors;

whereby a steering assistance of said additional wheels is provided by generating said differential torque by said additional motors an thus producing steering assistance forces due to said lever arms.

15. A method according to claim 14, further comprising the step of producing a third additional output signal for moving said locking means between a first position where said locking means maintain said additional tie rod in a substantially central position and a second position where said locking means do not prevent said additional tie rod from moving.

16. A method according to claim 15, further comprising the step of obtaining a fifth fourth signal indicative of a speed of said vehicle, said third additional output signal being further responsive to said fourth signal, said locking means being at said second position when said speed is below a predetermined value.

17. A method for producing a steering assistance in a low speed vehicle travelling on the ground, said vehicle comprising:

a steering wheel;

a tie rod;

two wheels operatively attached to said vehicle, each of said wheels being steerable around a pivot axis and having a mean traction point laterally offset with an intersection point of a virtual prolongation of said pivot axis with the ground, a virtual lever arm being defined between each of said mean traction points and the corresponding intersection point of said pivot axis with the ground;

a steering linkage mechanically connecting said tie rod to said wheels, said tie rod keeping said wheels constantly and substantially parallel to each other; and two mechanically independent motors respectively connected to said two wheels;

said method comprising the steps of:

obtaining a first signal indicative of a position of said steering wheel;

obtaining a second signal indicative of a position of said tie rod; and producing two output signals responsive to said first and second signals, said two output signals being indicative of a differential torque to be generated by said motors;

whereby a steering assistance is provided by generating said differential torque by said motors and thus producing steering assistance forces due to said lever arms.

* * * * *